United States Patent

Rast et al.

[15] 3,640,733

[45] Feb. 8, 1972

[54] EDIBLE SUBSTRATES COLORED WITH MONOAZO DYESTUFFS

[72] Inventors: Gustav E. Rast, Hamburg; Russell I. Steiner, Williamsville, both of N.Y.

[73] Assignee: Allied Chemical Corporation, New York, N.Y.

[22] Filed: Dec. 10, 1969

[21] Appl. No.: 880,516

Related U.S. Application Data

[62] Division of Ser. No. 639,264, May 18, 1967, abandoned.

[52] U.S. Cl. .................................................99/148, 99/103
[51] Int. Cl. ...............................................A23l 1/26
[58] Field of Search ...........................................99/103, 148

[56] References Cited

UNITED STATES PATENTS

| | | | |
|---|---|---|---|
| 3,052,552 | 9/1962 | Koerner et al. | 99/148 |
| 3,220,853 | 10/1965 | Golosinec et al. | 99/148 |
| 3,307,954 | 3/1967 | Blakemore | 99/102 |

*Primary Examiner*—Raymond N. Jones
*Assistant Examiner*—J. M. Hunter
*Attorney*—Michael S. Jarosz

[57] ABSTRACT

Monoazo compounds of this invention, which may be termed 1-([2-alkoxy-5-alkyl-4-sulfophenyl]azo)-2-naphthol-6-sulfonic acids and physiologically acceptable salts thereof are used as dyestuffs for various substrates and especially for edible substrates, such as maraschino cherries.

10 Claims, No Drawings

EDIBLE SUBSTRATES COLORED WITH MONOAZO DYESTUFFS

This application is a division of application Ser. No. 639,264, filed May 18, 1967, now U.S. Pat. 3,519,617 issued July 18, 1970.

The invention relates to the production of novel red monoazo dyestuffs. More particularly, the present invention is directed to highly soluble red monoazo dyestuffs and to their use as colorants, especially in dyeing of edible substrates.

Certain red dyes have found use in the past in various coloring or dyeing applications, especially in the coloring of foodstuffs or other edible substrates. One such dyestuff (FD&C Red No. 4) recently has been delisted for essentially all edible uses by the Food and Drug Administration, thereby creating a need for a red dye particularly useful in the coloring of edible substrates.

Accordingly, one object of the present invention is to provide new and useful dye compositions.

A further object of the present invention is to provide highly soluble nontoxic monoazo dye compositions which are useful in the coloring of edible substrates.

Other objects of this invention will be readily apparent to those skilled in the art from the following description.

The monoazo dyestuffs of the present invention correspond to the formula:

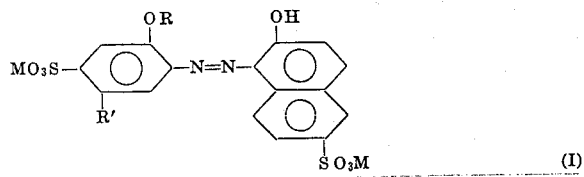

wherein R and R' are each lower alkyl containing from one to six carbon atoms and M is hydrogen, ammonium or a physiologically acceptable metal carbon, such as sodium, potassium, barium, calcium and iron. Preferred dyestuffs of the present invention are compounds conforming to above formula (I) wherein R and R' are each methyl and M IS sodium, potassium or ammonium because of the particularly low toxicity and high water solubility of such compounds; most preferred of the compounds of the present invention is the disodium salt of 1-([6-methoxy-4-solfo-m-tolyl]azo)-2-naphthol-6-sulfonic acid. It is to be understood that mixed salts, such as the monosodium, monopotassium salts, as well as acid salts are contemplated as being within the present invention. Representative compounds of the present invention other than the aforementioned disodium salt include:

1-([6-methoxy-4-sulfo-m-tolyl]azo)-2-naphthol-6-6sulfonic acid 1-([6-methoxy-4-sodiumsulfo-m-tolyl]azo)-2-naphthol-6-sulfonic acid dipotassium salt of 1-([6-methoxy-4-sulfo-m-toly]azo)-2-naphthol-6-sulfonic acid diammonium salt of 1-([6-methoxy-4-sulfo-m-tolyl]azo)-2-naphthol-6-sulfonic acid calcium salt of 1-([6-methoxy-4-sulfo-m-tolyl]azo)-2-naphthol-6-sulfonic acid barium salt of 1-([6-methoxy-4-sulfo-m-tolyl]azo)-2 naphthol-6-sulfonic acid ferrous salt of 1-([6-methoxy-4-sulfo-m-tolyl]azo)-2 naphthol-6-sulfonic acid disodium salt of 1-([6-ethoxy-4-sulfo-m-tolyl]azo)-2-naphthol-6-sulfonic acid disodium salt of 1-([6-propoxy-4-sulfo-m-tolyl]azo)-2-naphthol-6-sulfonic acid disodium salt of 1-([2-methoxy-5-ethyl-4-sulfo-phenyl]azo)-2naphthol-6-sulfonic acid disodium salt of 1-([2-ethoxy-5-ethyl-4-sulfo-phenyl]azo)-2-naphthol-6-sulfonic acid disodium salt of 1-([2-propoxy-5-propyl-4-sulfo-phenyl]azo)-2-naphthol-6-sulfonic acid As previously indicated, the dyestuffs of the present invention are essentially nontoxic to warmblooded animals and are sufficiently soluble in water to meet the requirements of the Food and Drug Administration as to tolerances governing dye content. For example, the disodium salt of 1-([6-methoxy-4-sulfo-m-tolyl]azo)-2-naphthol-6-sulfonic acid, one of the preferred dyes of the present invention, is soluble to the extent of about 18 parts per 100 parts of water at 2° C.. Further, these dyestuffs are stable to sulfur dioxide in aqueous solutions, to hydrogen ions in aqueous solutions having a pH of 3 or higher, to ascorbic acid in concentrations ranging from about 50 to 100 p.p.m., which are commonly encountered in food preparations, as well as to heat such as that encountered in baking operations, e.g., 175° C. for 25 minutes. Additionally, when used to color soft drinks, these dyestuffs provide compositions which are essentially noncorrosive to beverage containers for periods of at least 6 months. The novel dyestuffs also possess excellent light stability in a variety of edible substrata and exhibit excellent retentive properties when contacted with such substrata.

These characteristics of the red monoazo dyestuffs of the present invention are indicative of their suitability as colorants for edible substrata, e.g., fruits, such as cherries; sugar patties; hard candies; gelatine desserts; soft drinks, both carbonated and uncarbonated; cake and cookie prepared mixes; as well as wrappings and printed labels which, in use, come in contact with these and other food compositions. These characteristics together with their extremely low toxicity to warmblooded animals, as determined by both acute and chronic feeding tests, indicate their value as an addition to the list of dyestuffs certifiable by the United States Government Food and Drug Administration. For example, acute feeding tests using the disodium salt of 1-([6-methoxy-4-sulfo-m-tolyl]azo)-2-naphthol-6-sulfonic acid have demonstrated that animals tolerate high levels of this dyestuff while chronic feeding tests involving additions of up to 5.0 percent, by weight, of this dyestuff to normal rations indicated no significant changes in the growth rate and food consumption of rats as compared with a control group studied simultaneously.

Exemplary of the preferred method of preparation of the dyestuffs of the present invention, the disodium salt of 1-([2-alkoxy-5-alkyl-4-sulfophenyl]azo)-2-napthhol-6-sulfonic acid may be prepared as follows; One part of a sulfanilic acid, corresponding to the formula:

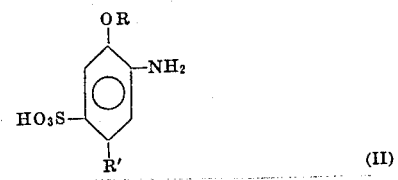

wherein R and R' are each as above defined, is slurried in about 5 to 6 parts, by weight, of water and dissolved by the addition of about 1.0 to 1.2 parts, by weight, of 20° B. hydrochloric acid. The solution is cooled to about 0° C. by the addition of ice. To this, there is added slowly about 0.33 to 0.35 parts of sodium nitrite (added as a 30 percent aqueous solution) and the mixture is agitated, at about 0° to 5° C., for at least 1 hour. The resulting diazonium salt solution is added slowly to an alkaline solution of Schaeffer's Salt (2-hydroxy-naphthalene-6-sodium sulfonate) consisting of about 1.1 parts of Schaeffer's Salt, 8 parts of water and 1 to 2 parts of sodium carbonate, the coupling solution being cooled to about 10° C. with added ice. The resulting mixture which is alkaline to Brilliant Yellow Indicator and which contains an excess of Schaeffer's Salt, is agitated for about 16 hours and then after being heated to about 65° to 70° C., is salted to about 5 to 15 percent concentration by the addition of sodium chloride. The mixture is agitated for about 2 to 8 hours as it cools to ambient temperature and the resulting slurry is filtered. The filter cake of the crude monoazo product is purified by dissolving it in about 5 to 6 parts, by weight, of warm (55° C.) water and adding to the solution about 9.5 part, by weight, of disodium phosphate.

After being agitated at 55° to 65° C. for about 0.5 to 1 hour, about 0.25 to 1 part, by weight, of decolorizing charcoal and 0.25 to 1 part, by weight, of a filter aid is added and the mixture is filtered. The clarified filtrate is salted to precipitate the dyestuff as the disodium salt which is recovered by filtration from the saline mother liquor. The filter cake may be dried in conventional manner.

Other physiologically acceptable salts corresponding to above formula (I) may be prepared by known procedures. For example, the alkaline coupling mixture may be rendered acid with a mineral acid, such as hydrochloric, sulfuric or nitric acid, and potassium hydroxide may be added to the resultant acid mixture to cause precipitation of the corresponding potassium salt; similarly, if ammonium hydroxide were to be added instead of potassium hydroxide at this stage, the corresponding ammonium salt would be obtained. Other physiologically acceptable salts may likewise be obtained by adding a soluble salt, for example, calcium chloride, barium chloride, ferrous sulfate, to the alkaline coupling mixture to cause the corresponding calcium, barium or ferrous salt to precipitate. The free acids, i.e., compounds of formula (I) wherein M is hydrogen, are readily obtainable by neutralization of the alkaline coupling mixture, for example, with a mineral acid, thereby causing precipitation thereof from the neutralized coupling mixture; complete isolation of the free acids can be effected by extraction of the neutral to acid mass with a water-immiscible organic solvent, for example, diethylether, ethyl acetate, etc., and thereafter, evaporation of the solvent from the extract.

The term "edible substrata" as used in this specification and the claims appended hereto is intended to include a wide variety of food, pharmaceutical and cosmetic compositions. These may be in either solid or liquid form. Included also are wrappings and labels of various forms colored or printed thereon with inks containing these dyestuffs, which may come in contact with the material encased or labeled.

The addition of the dyestuffs of our invention to and incorporation in edible substrata is effected by methods well known in this art, for example, by methods conventionally used with FD&C Red No. 4, and hence, detailed discussion of this collateral aspect of our invention is deemed unnecessary.

The following examples will serve to illustrate practice of the invention but they are not intended to limit it to the details described herein. Parts and percentages are by weight and temperatures are given in degrees Centigrade, unless otherwise specified.

EXAMPLE I

To a slurry of 521 parts of 5-methoxy-2-methyl-sulfanilic acid in 3,000 parts of water, 580 parts of 20° B. hydrochloric acid were added. The mixture was agitated for about ½ and the resulting solution was cooled to about 0° by the addition of ice. Then, 173 parts of sodium nitrite, in the form of a 30 percent aqueous solution, were added to the mass over a period of about ¾ hour while maintaining the solution at or below 5°. The resulting mixture thereafter was agitated for about one and one quarter hours to complete the diazotization reaction.

In a separate vessel, 591 parts of Schaeffer's Salt (2-naphthol-6-sodium sulfonate) were slurried in 4,000 parts of hot water and 600 parts of sodium carbonate, as a 20 percent aqueous solution, were added thereto. The mixture was heated to 65° and the resultant solution was cooled first to below 45° and then to about 10° by the addition of ice. The diazonium salt solution prepared above was slowly (over a period of about 1 hour) added to the Schaeffer's Salt solution. The alkaline to Brilliant Yellow indicator coupling solution was agitated for about 16 hours and then was heated to between 65° and 70°. After the addition of 1,800 parts of lime free sodium chloride, the mixture was agitated for 4 hours as it gradually cooled to ambient temperature and the resultant precipitate which formed was filtered from its mother liquor.

The filter cakes from two such couplings were combined and dissolved in 10,000 parts of warm (55°) water. To this solution 127 parts of anhydrous disodium phosphate were added and the mass was agitated at 65° to 75° for ½ hour. After the addition of 120 parts of decolorizing charcoal, the mass was agitated for ½ hour and 120 parts of filter aid material were added. The mixture was agitated for 1 hour and then filtered. To the clarified filtrate, 1,500 parts of lime-free sodium chloride were added slowly, and the mixture was agitated for about 16 hours to permit the mass to cool and the purified monoazo dyestuff to precipitate. The slurry was filtered and the filter cake was dried in a circulatory warm air oven. The solid product, the disodium salt of 1([6-methoxy-4-sulfo-m-tolyl]azo)-2-naphthol-6-sulfonic acid, corresponds to the formula:

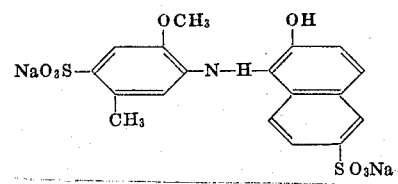

EXAMPLE II

The surprising solubility in water of dyestuffs of the present invention is demonstrated by the following data wherein the solubility of the dyestuff prepared in Example I, above, was compared at various temperatures with that of FD&C Red No. 4.

The latter has the formula:

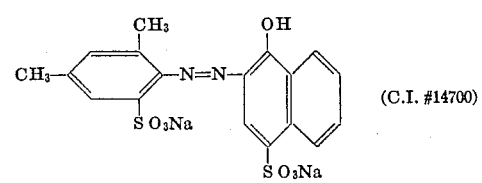

(C.I. #14700)

The tests were carried out as follows:

An excess quantity of the dyestuff, was incrementally added to 25 parts of distilled water, shaking after each addition. The vessel was placed in a constant temperature bath maintained at a predetermined temperature. The resulting saturated solution was permitted to stand for several hours in the constant temperature bath and then filtered. A 5-part aliquot of the filtered solution was evaporated to dryness in a tared crucible at 130°. From the weight of the residue, the solubility of the dye in distilled water at the indicated temperature is determined. These comparative data are given in Table I below.

TABLE I

| Temp. | Solubility in Distilled Water FD&C Red No. 4 | Product of Ex. 1 |
| --- | --- | --- |
| 2° | 4.3% | 18.0% |
| 25° | 7.4% | 22.0% |
| 60° | 8.6% | 26.4% |

The significantly greater solubility in water of the dyestuff of Example I compared to that of FD&C Red No. 4 is surprising since both dyes have two solubilizing groups and are quite similar structurally and hence should possess a solubility character in the same general area, as is indeed the fact when the solubility of these two dyestuffs is compared in 100 percent ethanol and 50 percent aqueous ethanol at 25°, the solubility being, in each instance, trace and 1.3 percent respectively.

EXAMPLE III

Maraschino cherries which had been dyed with FD&C Red No. 4 and with the dyestuff prepared in Example I were stored for 2 months in light sugar syrup containing about 200 p.p.m. of $SO_2$, at ambient temperature. The cherries were placed on white filter paper and examined. Those dyed with FD&C Red No. 4 possessed a bright yellow-red shade and produced a slight red bleed on the filter paper. Those cherries dyed with the dyestuff on this invention were slightly duller in shade but yielded practically no bleed onto the white filter paper, indicating that it was superior in this respect to FD&C Red No. 4.

This characteristic was again demonstrated by placing half and whole cherries in contact with pear halves in light sugar syrup (such as is used in the conventional fruit cocktail preparation). After 5 days the fruits were examined. The pears stored with cherries dyed with FD&C Red No. 4 were colored a strong pink indicating that the dye had bled off from the cherries. The pears stored with the cherries dyed with dyestuff of Example I were a yellow pink in shade indicating a light "on tone" yellow-pink bleed, which is generally more acceptable than the shade imparted by the FD&C Red No.4.

It can thus be seen that valuable and highly desirable red monoazo dyestuffs which are substantially nontoxic to warm-blooded animals and edible substrata colored therewith have been provided. The new dyestuffs are characterized also by surprisingly excellent solubility in water.

Our invention has been described and illustrated by reference to specific embodiments thereof, and the examples illustrate the best mode presently known of carrying out the invention. It should be noted, however, that variations of these procedures are feasible and many such variations will be obvious to those skilled in this art in view of the disclosures contained herein.

We claim:

1. A composition comprising an edible substrate colored with a monoazo dyestuff having the formula

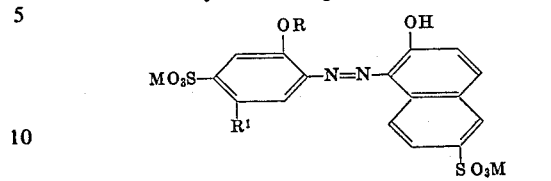

wherein R and $R^1$ are each lower alkyl and M is hydrogen, ammonium or a physiologically acceptable metal cation.

2. A composition as described in claim 1 wherein the edible substrate is a fruit.

3. A composition as described in claim 2 wherein the fruit is a Maraschino cherry.

4. A composition as described in claim 1 wherein R is methyl and $R^1$ is lower alkyl.

5. A composition as described in claim 1 wherein R is lower alkyl and $R^1$ is methyl.

6. A composition as described in claim 1 wherein R and $R^1$ are each methyl.

7. A composition as described in claim 6 wherein M is sodium.

8. A composition as described in claim 4 wherein the edible substrate is a Maraschino cherry.

9. A composition as described in claim 5 wherein the edible substrate is a Maraschino cherry.

10. A composition as described in claim 6 wherein the edible substrate is a Maraschino cherry.

* * * * *

PO-1050
(5/69)

UNITED STATES PATENT OFFICE
CERTIFICATE OF CORRECTION

Patent No. 3,640,733                    Dated February 8, 1972

Inventor(s) Gustav E. Rast and Russell I. Steiner

It is certified that error appears in the above-identified patent and that said Letters Patent are hereby corrected as shown below:

Col. 1, line 20   "nontoxic" should be -- non-toxic --;

Col. 1, line 39   "IS" should be -- is --;

Col. 1, line 43   "4-solfo-" should be -- 4-sulfo- --;

Col. 1, line 49   "naphthol-6-6sulfonic" should be
                  -- naphthol-6-6 sulfonic --;

Col. 1, line 60   "azo)-2" should be -- azo)-2- --;

Col. 1, line 62   "azo)-2" should be -- azo)-2- --;

Col. 1, line 69   "-2naphthol" should be -- -2-naphthol --;

Col. 1, line 75   "nontoxic" should be -- non-toxic --;

Col. 2, line 14   "noncorrosive" should be -- non-corrosive --;

Col. 2, line 41   "-2-napthhol" should be -- -2-naphthol --;

Col. 2, line 42   "follows;" should be -- follows: --;

Col. 2, line 56   "20°B." should be -- 20°Be' --;

Col. 2, line 68   "then after" should be -- then, after --;

Col. 2, line 75   "0.5 part," should be -- 0.5 part, --;

Col. 3, line 53   "20°B." should be -- 20°Be' --;

Page 2

PO-1050
(5/69)

UNITED STATES PATENT OFFICE
CERTIFICATE OF CORRECTION

Patent No. 3,640,733      Dated February 8, 1972

Inventor(s) Gustav E. Rast and Russell I. Steiner

It is certified that error appears in the above-identified patent and that said Letters Patent are hereby corrected as shown below:

Col. 3, line 54   "1/2 and"   should be   -- 1/2 hour and --;

Col. 4, line 14   "1([6-methoxy"   should be   -- 1-([6-methoxy --;

Col. 4, line 15   "-2-maphthol"   should be   -- -2-naphthol --;

Col. 4, line 20, first formula "-N-H-" should be
                 -- -N=N- --;

Col. 5, line 4   "p.p.m."   should be   -- ppm --;

Col. 5, line 9   "on"   should be   -- of --;

Col. 5, line 24   "nontoxic"   should be   -- non-toxic --.

Signed and sealed this 5th day of December 1972.

(SEAL)
Attest:

EDWARD M. FLETCHER, JR.                      ROBERT GOTTSCHALK
Attesting Officer                              Commissioner of Patents

Disclaimer 3,640,733.—*Gustav E. Rast*, Hamburg, and *Russell I. Steiner*, Williamsville, N.Y. EDIBLE SUBSTRATES COLORED WITH MONOAZO DYESTUFFS. Patent dated Feb. 8, 1972. Disclaimer filed July 17, 1972, by the assignee, *Allied Chemical Corporation*.

Hereby disclaims the portion of the term of the patent subsequent to July 7, 1987.

[*Official Gazette February 19, 1974.*]